US005734531A

United States Patent [19]
Nix et al.

[11] Patent Number: 5,734,531
[45] Date of Patent: Mar. 31, 1998

[54] MAGNETO-RESISTIVE READ/WRITE HEAD HAVING A COMBINATION POLE/SHIELD

[75] Inventors: J. Lamar Nix, Boulder; Robert E. Weinstein, Louisville, both of Colo.

[73] Assignee: Quantum Peripherals Colorado, Inc., Louisville, Colo.

[21] Appl. No.: 550,872

[22] Filed: Oct. 31, 1995

[51] Int. Cl.⁶ .................................................. G11B 5/39
[52] U.S. Cl. ............................................................ 360/113
[58] Field of Search ............................................... 360/113

[56] References Cited

U.S. PATENT DOCUMENTS

| 5,438,747 | 8/1995 | Krounbi | 360/113 |
| 5,452,164 | 9/1995 | Cole | 360/113 |

Primary Examiner—A. J. Heinz
Attorney, Agent, or Firm—Lee R. Osman; William J. Kubida; Holland & Hart LLP

[57] ABSTRACT

Disclosed is an MR head, and the method of making the same, which has a pole/shield. In the preferred embodiment, the pole side of the pole/shield is constructed such that it has a length that is approximately equal to the length of the pole, and a shield side that is approximately the length of a shield. Through this construction, the MR element, which is disposed between the shield side and the shield, is fully shielded during a read operation. Additionally, the flux lines generated during a write operation approximate the length of the pole so that excessive fringing does not occur. As a result of the smaller flux lines generated between the pole and the pole side of the pole/shield, data may be more densely packed on the disk used in conjunction with the MR head.

22 Claims, 8 Drawing Sheets

5,734,531

MAGNETO-RESISTIVE READ/WRITE HEAD HAVING A COMBINATION POLE/SHIELD

CROSS REFERENCE TO RELATED APPLICATIONS

The present application is related to the subject matter of U.S. patent application Ser. Nos. 08/461,411 filed Jun. 5, 1995, 08/681,042 filed Jul. 22, 1996, and 08/804,954 filed Feb. 24, 1997 for "Flux Enhanced Write Transducer and Process for Producing the Same in Conjunction with Shared Shields on Magnetoresistive Read Heads", all assigned to Quantum Peripherals Colorado, Inc.

FIELD OF THE INVENTION

This invention relates to a magnetoresistive (MR) read/write head, and more particularly to an MR head in which the pole side of the pole/shield is approximately the same length as the pole, and the shield side of the pole/shield is approximately the same length as the shield.

BACKGROUND OF THE INVENTION

Computer disk drives use a slider, which typically flies in proximity to a disk, to perform read and write operations. Such sliders have a so called "head", which may contain an electrical element to read data and a separate electrical element to write data on the disk. The element which writes data on the disk is typically made up of two poles that are separated by a gap, and which generate a magnetic field when they are excited by a coil surrounding one of the poles. When the slider is in proximity to the disk, a magnetic field generated by the poles causes magnetic orientations in given locations on the disk. In this manner, data is written on the disk.

The element which reads data usually includes an MR element which is sandwiched between two shields. During a read operation the head flies in proximity to the disk so that the MR element senses the magnetic orientations of the given disk locations. To the extent that the MR element must be able to focus upon a given, isolated disk location during reading, meaning that the MR element must not be effected by the magnetic orientation of adjoining disk locations, it is desirable to shield the MR element. This is accomplished by isolating the MR element with two relatively large shields, which tend to filter out the magnetic effects of adjoining disk locations, so that a specific disk location can be focused upon for reading.

An MR head is one which generally combines the read and write elements of the head into one unit. It does so by generally eliminating one of the poles of the write element and substituting in its place one of the shields of the read element. In doing so an integrated pole/shield element is created.

One of the problems resulting from this combination is that when one of the relatively large shields is substituted for a pole, the size of the area of the disk magnetized during a write operation increases. In other words, because the pole/shield is physically larger than the pole that has been eliminated, the pole/shield will tend to undesirably effect a larger part of the disk during a write operation, which is a phenomenon referred to as "fringing". Fringing has an adverse effect on the efficient storage of data on the disk given that it is usually desirable to pack data on the disk as densely as possible, thereby increasing the storage capacity of the disk.

What is needed therefore, is an MR head which combines the advantages of a shared pole/shield, but which avoids the problems associated with fringing.

SUMMARY OF THE INVENTION

It is a principle object of the present invention to provide an MR head which reduces fringing.

It is another object of the present invention to provide an MR head having a pole/shield with a pole side, and a pole, the pole side being no more than 20% shorter than the pole.

It is another object of the present invention to provide an MR head having a pole/shield with a pole side, and a pole, the pole side being up to 25% longer than the pole.

It is another object of the present invention to provide an MR head of the foregoing type which can be fabricated at the wafer level.

It is another object of the present invention to provide an MR head of the foregoing type which can be fabricated at the bar level.

The present invention is embodied in a head for use in reading and writing data on magnetic media. The head for comprises a pole/shield having a pole side, which is used for writing when the head engages in a write operation, and a shield side, which is used for shielding when the head engages in a read operation. The pole side is a different length than said shield side.

More specifically, the present invention is embodied in a slider for reading and writing data on a disk, the slider comprising an MR head having a pole/shield, the pole/shield having a pole side used when the MR head engages in a write operation, and having a shield side which is used for shielding when the MR head engages in a read operation. Again, the pole side is a different length than the shield side.

The present invention is also embodied in a method for making an MR head. The method comprises the step of fabricating the MR head which has a pole/shield, the pole/shield having a pole side and a shield side. The pole side is used when the MR head engages in a write operation. The shield side is used for shielding when the MR head engages in a read operation. The pole side is a different length than said shield side.

The method embodying the present invention can also include the step of making the pole side shorter than the shield side, or the step of fabricating the MR head to include a pole, with the pole and the pole side made to have the same length.

Given that this description only briefly summarizes the invention, a more complete understanding of the invention, as well as its objects, features, and advantages will be appreciated upon consideration of the following detailed description of the preferred embodiment, presented in conjunction with the accompanying drawings, and the claims.

DETAILED DESCRIPTION OF THE PREFERRED EMBODIMENT

Figure 1:
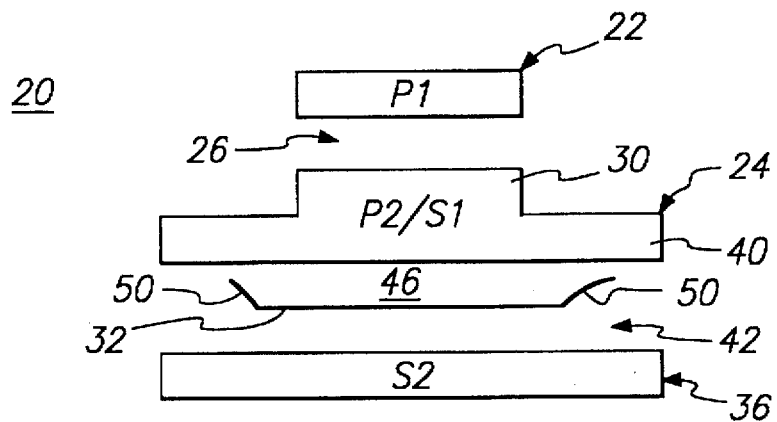
FIG. 1 is a block style illustration of an MR head in accordance with an embodiment of the present invention.

Referring first to FIG. 1, a block style illustration is provided of an embodiment of an MR head 20 in accordance with the present invention. As shown in FIG. 1, MR head 20 includes a pole (P1) 22 and a shared pole/shield (P2/S1) 24, which are separated from one another by write gap 26. Pole 22 and pole side 30 of pole/shield 24, together, are responsible for write operations. For purposes of this detailed description, pole side 30 of pole/shield 24 is that segment of pole/shield 24 which is physically closest to pole 22, and is shown as the raised portion of pole/shield 24 in FIG. 1.

MR head 20 further includes an MR element 32 and a shield (S2) 36. As seen in FIG. 1, MR element 32 is effectively sandwiched in between shield 36 and the shield side 40 of pole/shield 24; however, MR element 32 is separated from shield 36 by gap 42, and separated from shield side 40 of pole/shield 24 by gap 46. MR element 32, shield 36, and the shield side 40 of pole/shield 24 are responsible for the read operations of MR head 20. MR element 32 is connected with leads 50, on either end of MR element 32, so that the magnetic orientation sensed by MR element 32 is coupled back to the other electronic componentry of the disk (not shown).

Also, for purposes of this detailed description, the term "Pole/shield" is used to indicate the MR head element, namely pole/shield 24, which serves the dual function of being a complementary pole for pole 22, and a complementary shield for shield 36.

In FIG. 1 it can be seen that the length of pole side 30 of pole/shield 24 is generally the same length as pole 22. In other embodiments, the length of pole side 30 of pole/shield 24 can be up to 20% smaller than the length of pole 22, or the length of pole side 30 of pole/shield 24 can be up to 25% larger than the length of pole/shield 24.

Advantageously, by having pole side 30 dimensioned the same size, or close to the same size, as pole 22, during a write operation there will be no appreciable fringing, such as the fringing which occurs if the pole side of the pole/shield of a given MR head were actually the same size as the shield. In other words, during a write operation, the flux lines generated between pole 22 and pole side 30 of pole/shield 24 will be roughly the length of pole 22. Consequently, the size of the area on the disk affected by the flux lines is closer to the length of pole 22, as opposed to the length of shield 36. Using such smaller area on the disk is, of course, desirable given that it results in the more compact storage of data on the disk.

Additionally, as indicated above, and as seen in FIG. 1, the length of shield side 20 of pole/shield 24 is shown to be approximately the same length as shield 36. Shield side 40 may, however, be shorter or longer than shield 36, provided MR element 32 is fully shielded during a read operation. Further details relating to the length of shield side 40 is provide below in connection with the discussion of FIG. 2.

In the particular embodiment shown in FIG. 1, and by dimensioning the pole side 30 of pole/shield 24 to be approximately the same as pole 22 and the shield side 40 of pole/shield 24 to be the same as shield 36, MR head 20 combines the benefits of an MR head with the performance of a head in which the read and write elements of the head are completely separated. In particular, MR head 20 has the ability to densely write data on the disk, and fully shield MR element 32 during reading.

Figure 2:
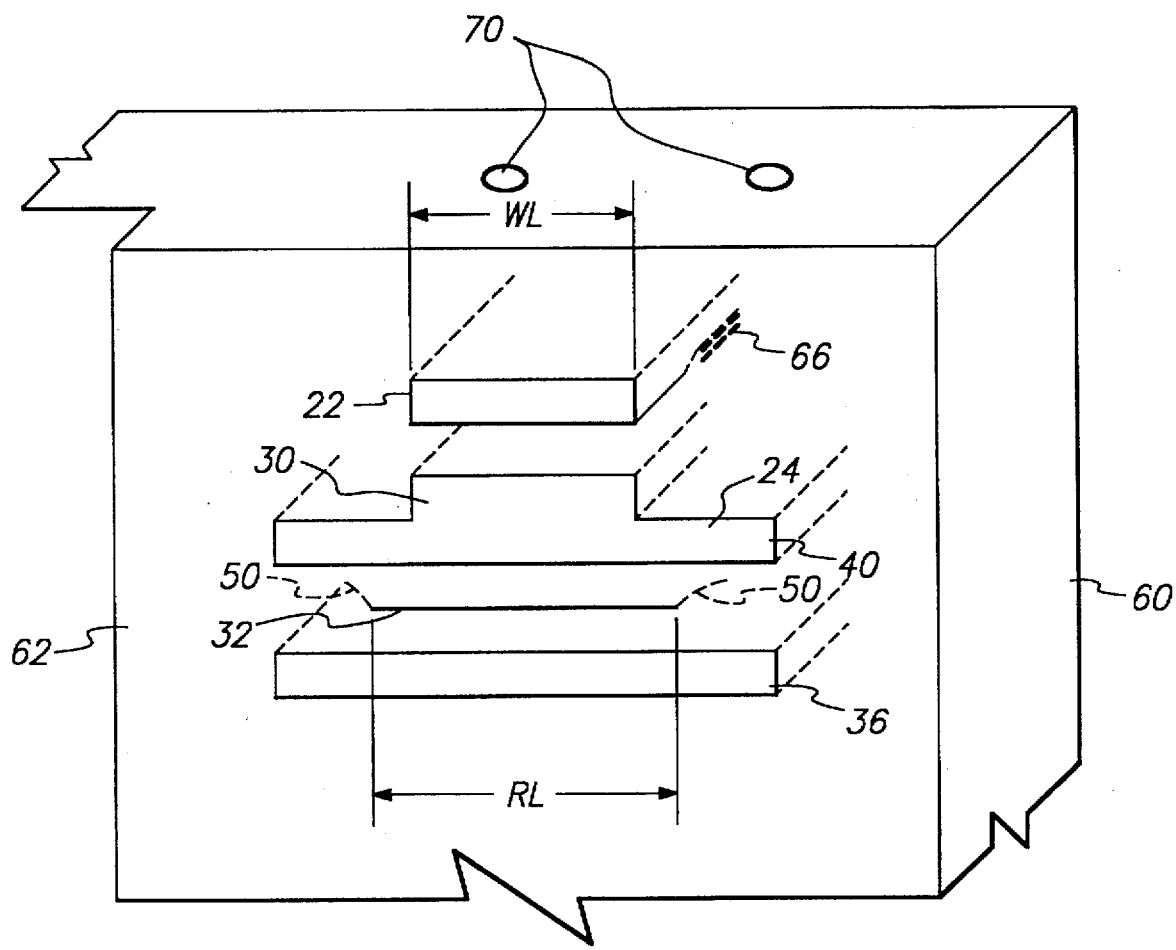
FIG. 2 is a sectioned isometric view of a slider, including the MR head of FIG. 1.

Referring now to FIG. 2, another illustration is provided of MR head 20 and a section of slider 60, on which MR head 20 is positioned. In FIG. 2, MR head 20 is shown to be mounted on slider 60, although due to the sectioned illustration, only part of slider 60 is visible. In one embodiment, MR head 20 is positioned on the section of the slider 60 which comes in closest proximity to the disk (not shown), when slider 60 is mounted on an arm assembly (not shown) which suspends slider 60 next to the disk. When the disk is moved relative to slider 60, typically by means of the rotation of the disk, MR head 20 is able to perform the read/write functions discussed above. Additionally, in the particular embodiment shown, slider 60 has a channel 62 generally in its center. On either side of channel 62 is an air bearing surface (ABS) 64, only a portion of one such ABS 64 is visible in FIG. 2 due to the sectioning of the illustration.

In FIG. 2 the dashed lines which extend into slider 60 are intended to suggest the three dimensional character of the elements—such as pole 22, pole/shield 24, MR element 32, and shield 36—which make up MR head 20. FIG. 2 further includes an illustration of coils 66, which are contained within slider 60 and are wound around a portion of pole 22. When MR head 20 is performing a write operation, coils 66 will be energized to thereby cause the generation of a magnetic flux between pole 22 and pole side 30 of pole/shield 24, which thereby induces a given magnetic orientation on the area of the disk over which slider 60 is flying at a particular instant in time. When MR head 20 is performing a read function, MR element 32 senses the magnetic orientation of specific locations on the disk, which is coupled back to disk circuitry by means of MR leads 50 and contacts 70, two of which are shown in FIG. 2.

Still referring to FIG. 2, a number of defined terms can now be discussed. For example, for purposes of this detailed description the term "WL" is defined to mean the longer of either the length of pole 22 or the length of pole side 30 of pole/shield 24, as both lengths are measured on the ABS. Accordingly, WL is shown on FIG. 2 to be equal to the length of pole 22, only because in the particular illustration, the length of pole 22 and pole side 30 are the same. It should be understood, however, in other embodiments, such as those discussed above, the length of pole 22 and pole side 30 may be different, and the term WL means whichever is the longer. Additionally, the term "RL" is defined to mean the length of MR element 32, as that length is measured on the ABS. RL is also shown in FIG. 2.

Having defined the terms WL and RL, further details may now be discussed regarding alternate embodiments in which shield side 40 of pole/shield 24 is not necessarily the same length as shield 36. More specifically, in alternate embodiments both shield side 40 and shield 36 may be any length so long as each is at least as long as the longer of WL or RL.

In one embodiment, the MR head 20 configuration shown and discussed in connection with FIGS. 1 and 2 can be integrally manufactured as part of the fabrication of a wafer which will be processed to produce multiple sliders 60. In other words, when the wafer is fabricated the sliders 60, which are integrally constructed in the wafer, each have a pole/shield 24 with a pole side 30 and a shield side 40 in the configuration shown in FIGS. 1 and 2. In yet another embodiment of the process of MR head fabrication, a generic MR head is constructed on the wafer level, and then the head is customized once the wafer is segmented into bars. Further details relating to these alternate processes—one being wafer level fabrication, and the other being bar level fabrication—are discussed below.

Figure 3:
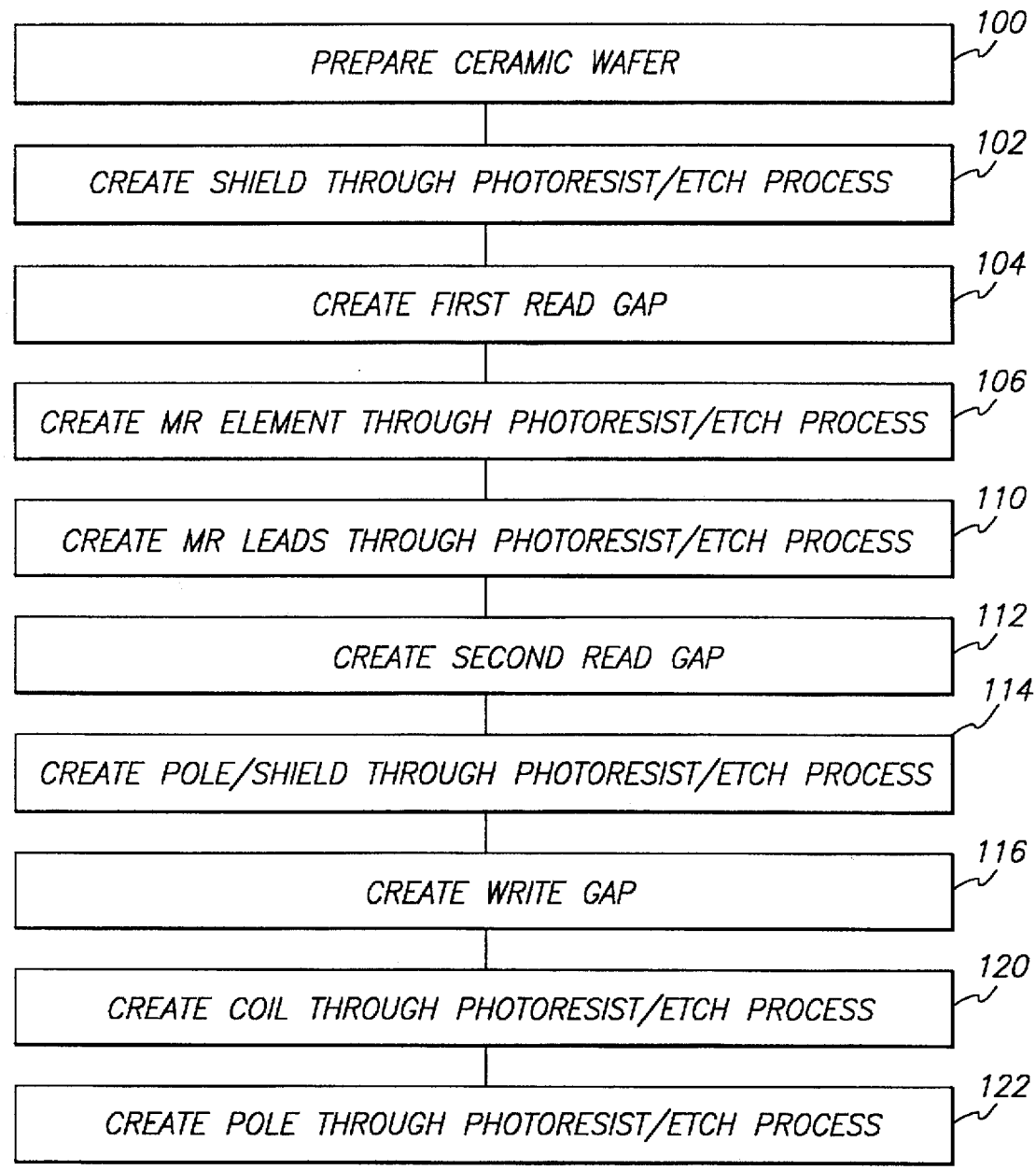
FIG. 3 is a flow diagram illustrating the process by which the slider and MR head, shown in FIG. 2, are manufactured on the wafer level.

Considering first the manufacturing of the MR head on the wafer level, reference is now made to the embodiment of the wafer fabrication process shown in the flow diagram of FIG. 3. It should be noted that the discussion of the process of wafer fabrication shown in the flow diagram generally focuses upon the construction of a single MR head 20. Given that one wafer will be processed to produce multiple sliders 60, each with their own respective MR head 20, the discussion of the fabrication of a single MR head 20, in connection with the flow diagram of FIG. 3, should be understood to apply to all of the MR heads 20 integrally made in the wafer.

The wafer fabrication process commences with a ceramic wafer base made of two phase material, onto which is sputter deposited aluminum oxide to a thickness of approximately 15 micrometers. In one embodiment, the two phase material is made of aluminum oxide and titanium carbide (AlO—CTi), which is commonly referred to as "Altic" or "Alsimag". The wafer is subsequently lapped and polished to a flat surface with sub-micrometer, surface defects. (Step 100.)

Next, a conductive seed layer of approximately 500 angstroms of nickel iron is sputtered onto the ceramic base. Photoresist frames are used to define the individual shapes for each of multiple shields 36 to be constructed on the wafer. Nickel iron is then electroplated to an approximate thickness of 2 microns, and the photoresist frames are then removed with a solvent, such as n-methyl-2 pyrrolidone (NMP). A photoresist "hat" is next formed over each shield 36 image by first applying a uniform layer of "positive" photoresist, which is a photoresist that, after exposure to UV light, will be removed by a developer solution in a development tank. The photoresist sold under the brand name AZ4210 by Hoechst Celanese, Inc. ("Hoechst") of Somerville, N.J., containing 71% propylene glycol monoethyl ether acetate, PMA, PGMEA, 1methoxy-2-propyl acetate, has been found to yield suitable results. After application of the photoresist and exposure to UV light through a mask, the exposed photoresist is developed out by placing the wafer in a development tank. Finally, the NiFe material in the field area between the shield images is removed by a solution of phosphoric acid. (Step 102.)

Read gap 42 is next added to the wafer by sputter depositing aluminum oxide to a thickness of approximately 2000 angstroms. (Step 104.)

Next, the magneto resistive film and biasing layer are deposited for MR element 32. This is formed by successively sputter depositing NiFe, Ta, and NiFeMo to approximate thicknesses of 300, 150, and 235 angstroms, respectively. In one embodiment, a permalloy composition of NiFe is used, having an atomic composition of approximately 81% nickel, and 19% iron. Additionally, the preferred composition of NiFeMo is 78% Ni, 15% Fe, 7% Mo measured by weight.

MR element 32 image is pattered next. This is accomplished by applying a uniform layer of positive photoresist, such as AZ4210, exposing the wafer to UV light through a mask, and developing out the exposed images of each MR element 32 for each MR head 20 on the wafer. MR element 32 is then formed by ion milling the wafer, removing incompletely the photoresist covering each MR element 32 image, and removing completely the metal layers lying outside the desired image. (Step 106.)

Next, metal electrodes are formed over MR element 32 to create MR leads 50. To do so, a uniform layer of photoresist, AZ4210, is applied over the wafer. Lead 50 shapes are defined over each MR element 32 image by exposing the photoresist to UV light through a mask. Unwanted, exposed photoresist is then developed away leaving a multiplicity of uncovered images where the conductive, lead metal is desired, and leaving a layer of photoresist where lead metal is not desired. Next, layers of titanium and gold are successively electron beam evaporated onto the entire wafer to thicknesses of approximately 50 and 2000 angstroms respectively. Finally, the wafer is immersed into an ultrasonic bath of a solvent, such as hot NMP, during which a lift-off process removes unwanted metal and photoresist. (Step 110.)

Next, read gap 46 is created by sputter depositing approximately 2000 angstroms of aluminum oxide over the entire wafer. (Step 112.)

Then, pole/shield 24 is added through a frame plating process, which is similar to the process for creating shield 36, as discussed above. For processing convenience, in one embodiment the perimeter dimensions of shield side 40 of pole/shield 24 are slightly less than those of shield 36. A layer of approximately 1000 angstroms of NiFe is sputter deposited as the plating seed layer. Next, a uniform blanket of positive photoresist is applied over the entire wafer. A plating frame is formed by exposing the resist to UV light through a mask. Exposed resist is removed by a developing solution, leaving a photo resist border defining the shape of the desired pole/shield 24.

Next, about 3 micrometers of NiFe are electroplated onto the wafer. A protective "hat" is formed over pole/shield 24 by applying a blanket of positive photoresist, exposing to UV light through a mask, and developing out the exposed resist. The "field" NiFe and seed layer NiFe are then removed by immersing the wafer in a phosphoric acid solution. Finally, the wafer is immersed in NMP, thereby removing the plating frame resist and hat resist, and leaving the newly formed pole/shield 24. In this particular embodiment, and due to the choice of a pole/shield 24 with a base that is somewhat smaller than shield 36, shield 36 and pole/shield 24 form a pyramid shaped configuration. Advantageously, this configuration keeps topography to a minimum in the critical areas around the MR element 32. (Step 114.)

Write gap 26 is next created by sputter depositing approximately 4000 angstroms of aluminum oxide. (Step 116.)

Write coil 66 is next added by applying a blanket of photoresist, such as AZ4400 which is also available through Hoechst, then exposing the wafer to UV light through a mask, and then developing out the exposed photoresist. This leaves a first planar layer of photoresist in an oval pattern which will serve as the foundation for the subsequent coil layer. The photoresist is then baked for approximately 3 hours at a temperature of 260° C. to drive out the solvents.

Next, coil 66, made of copper, is frame plated by sputter depositing a seed layer of chromium-copper of 1000 angstroms thickness. A photoresist layer, AZ4400, is applied, and patterned to make the frame for coil 66 by exposing it to UV light through a mask, developing it, and electroplating copper to a thickness of about 4 micrometers. A "hat" mask is next formed over the coil pattern with photoresist, AZ4400, leaving exposed the unwanted copper regions. The wafer is then immersed in a dilute acid solution to remove the copper and chrome coppers in these regions. Finally, the frame is stripped by immersing the wafer in NMP, or an acetone solution.

Next, another planarizing, photoresist layer is applied on top of coil 66 to create a second planar layer. The second planar layer also has an oval shape with a slightly smaller circumference than the first planar layer, creating a pyramid configuration, which encapsulates and insulates coil 66. The second planar layer is applied in the same manner as the first planar layer, and is also processed in the bake cycle. (Step 120.)

Next, pole 22 is added by sputtering a seed layer of NiFe to a thickness of about 1000 angstroms. Then, a photoresist frame of AZ4400 is added to define the shape of pole 22, after which 4 micrometers of NiFe are then electroplated to form pole 22. After formation a so-called "hat" mask is added to protect pole 22. Then, the field NiFe area is etched away using phosphoric acid solution, and finally the photoresist frame and hat are stripped away, yielding pole 22 with a thickness of approximately 5 micrometers. (Step 122.)

At this point of the fabrication process all of the elements of the MR head 20 shown in FIG. 1 and 2 have been constructed on the wafer. It should be noted, however, that the distinctive shaping of pole/shield 24 has not yet occurred. In other words, at the particular process stage described thus far, pole/shield 24 has been designated so that it is slightly smaller than shield 36, but pole side 30 has not yet been shaped to the dimension of pole 22.

Figure 4A:
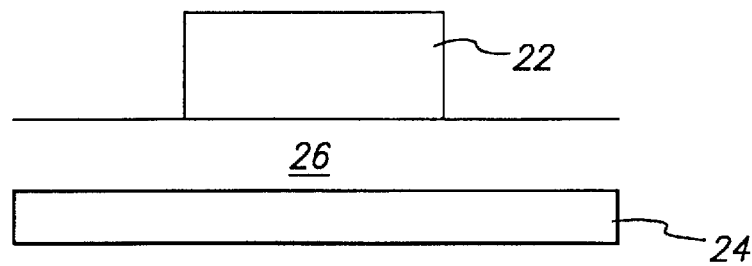
FIGS. 4A-4D are block style illustrations of the MR head of FIGS. 1 and 2 being processed on the wafer level.

Referring now to FIG. 4A, a block style illustration is provided to show the basic configuration of a portion of a single MR head 20, including pole 22, gap 26, and pole/shield 24, as it would be after process step 122. The next stage of the process is to perform this shaping operation in order to size pole side 30 to the approximate length of pole 22.

Figure 4B:
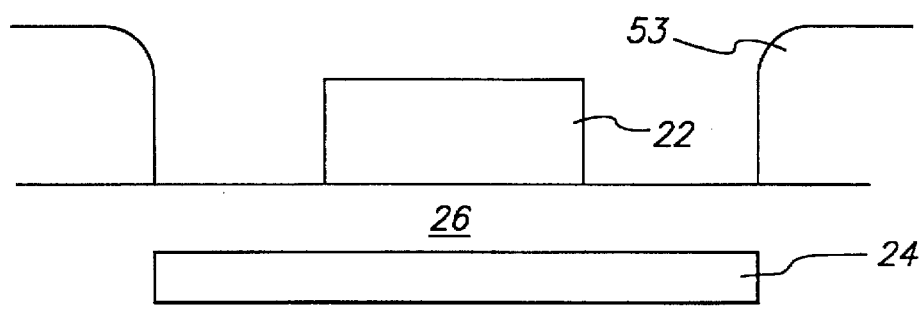

The process continues with the application of a thick blanket of photoresist, such as AZ5214, which is also available through Hoechst. A mask is then placed over the wafer, with the mask having a window through which UV light can pass during an exposure step. The window is positioned relative to the wafer such that the photoresist immediately above pole 22 is exposed to the UV light. After exposure to the UV light through the window in the mask, the wafer is placed in a development tank and the exposed photoresist is developed out. All of the remaining areas of the wafer remain protected by the photoresist. FIG. 4B provides a block illustration of the MR head 20 after the photoresist 53 has been applied and then removed through the development process in the area over pole 22 and pole/shield 24.

Figure 4C:
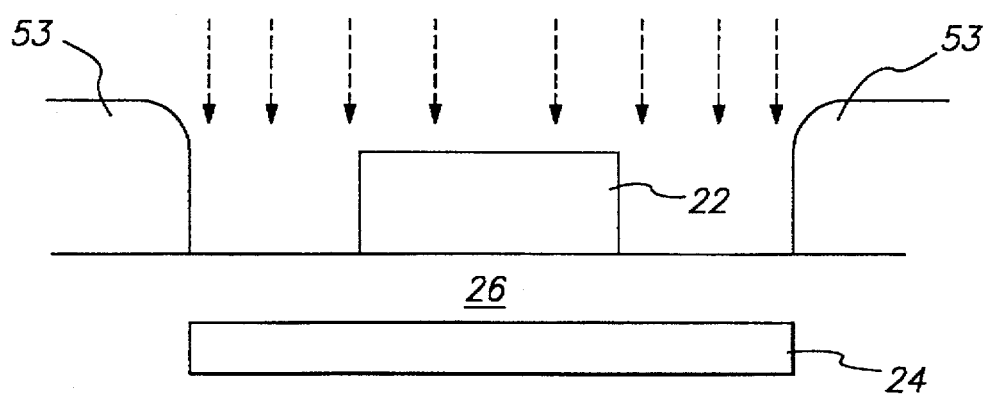
Figure 4D:
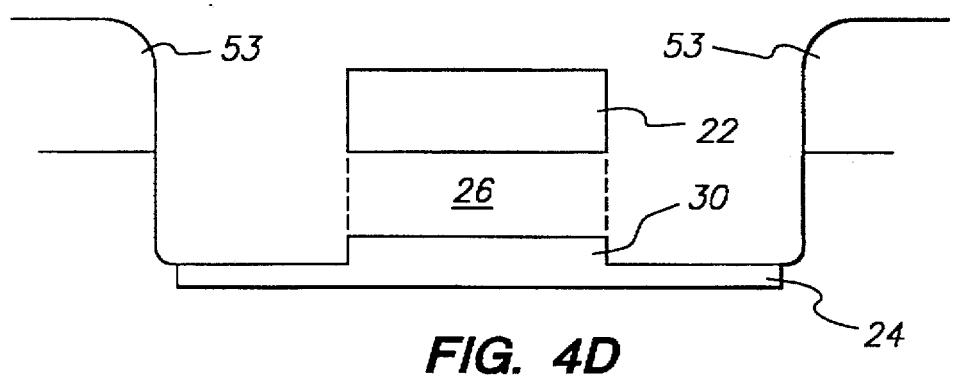

Next, as shown in FIG. 4C the wafer is ion milled (represented by the dashed arrows) to etch the exposed portions of pole 22, gap 26, and pole/shield 24. Through this process, the length of the pole side 30 of pole/shield 24 is made to be the same approximate length as pole 22, as shown in FIG. 4D. After ion milling the general blanket of photoresist is stripped away in a hot NMP ultrasonic bath.

Finally, the wafer is completed by frame plating the lead 50 connections for MR element 32 and for coil 66 using AZ4400 photoresist, and gold electroplating. The wafer is encapsulated by sputter depositing a layer of aluminum oxide over the entire wafer to a thickness of about 40 micrometers. Finally the wafer is lapped to expose contacts 70, as shown in FIG. 2.

Although a preferred method of fabricating a wafer with an MR head that is in the configuration of MR head 20, shown in FIGS. 1 and 2, has been described, it will be clear to those skilled in the art that there are any number of wafer fabrication techniques that can be adapted for the purpose of creating MR head 20, in which pole side 30 of pole/shield 24 is the same approximate length as pole 22, and shield side 40 of pole/shield 24 is the same approximate length as shield 36. After fabrication of the wafer in the manner discussed in connection with FIG. 3, above, the wafer must be further processed so that all of the individual sliders 60, integrally manufactured in the wafer, are produced.

Figure 5A:
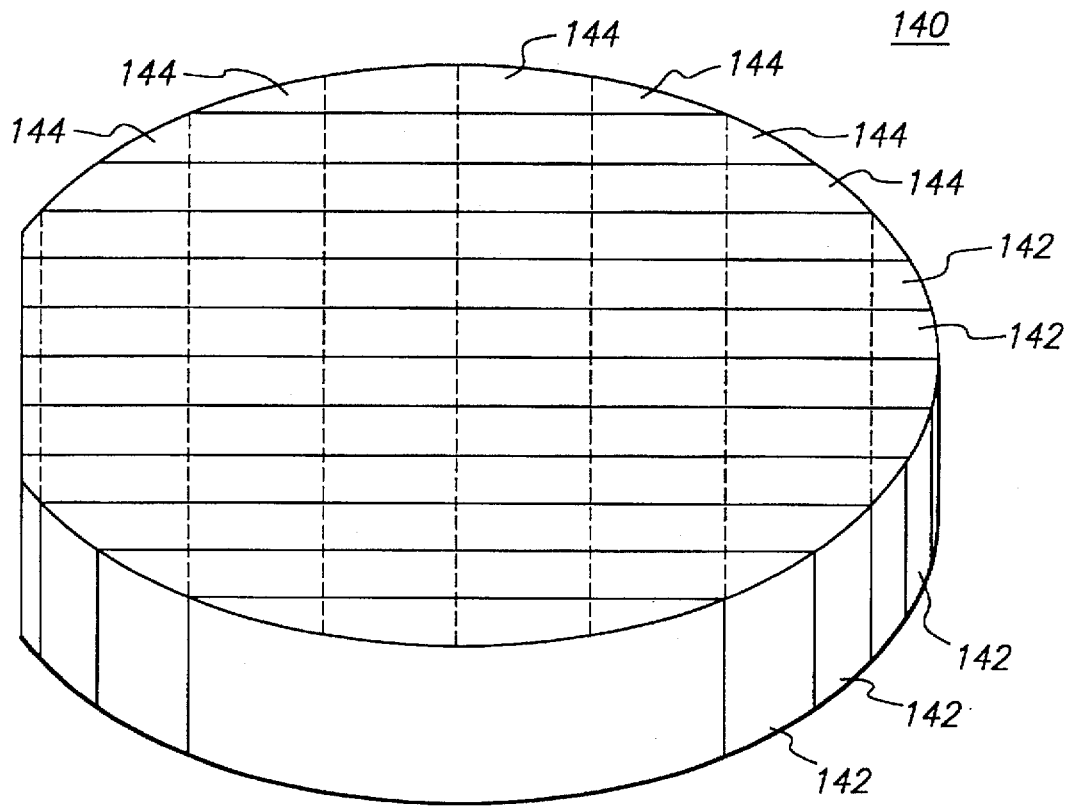
FIG. 5A is an illustration of a wafer, which could be fabricated using the general process described in FIG. 3, and which has been sliced into a number of bars and partly sliced into a number of columns.

Referring now to FIG. 5A, wafer 140 has been fabricated in the manner discussed above, such that wafer 140 integrally contains multiple MR heads 20 which are configured as shown in FIGS. 1 and 2. The further processing of wafer 140 involves completely slicing it into a number of bars 142, and partly slicing it into a number of columns 144. The columns 144 are established by partial slicing in order to keep a given bar 142 together during processing; however, the partial slice at this stage facilitates complete separation of the individual sliders 60 from one another at a later stage of the process.

Figure 5B:
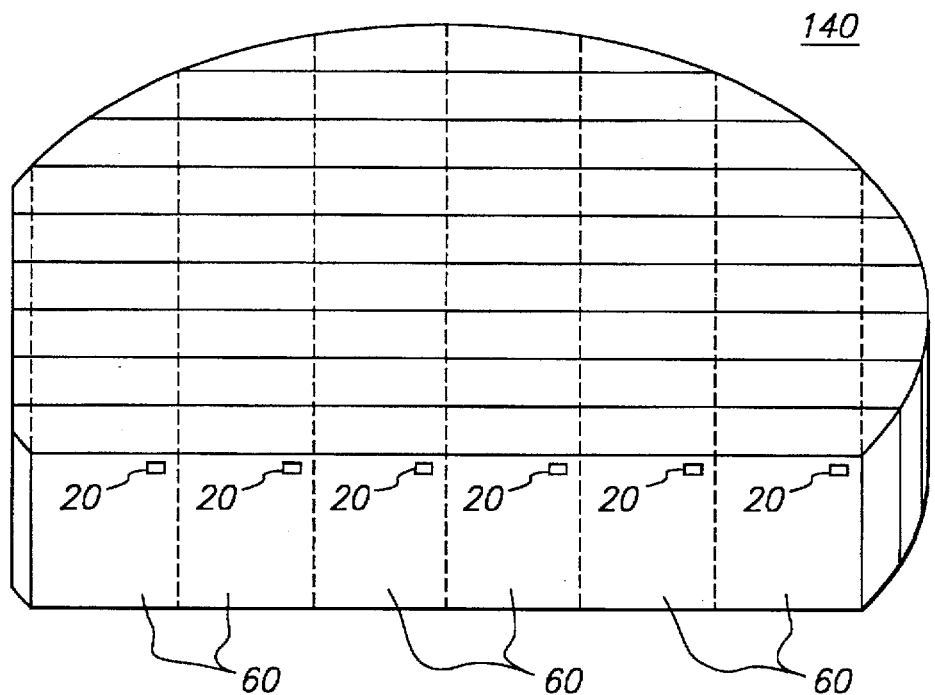
FIG. 5B is an illustration of the wafer of FIG. 5A, with a segment removed to show a number of sliders and MR heads.

Comparing FIG. 5B to FIG. 5A, a segment of wafer 140 has been removed revealing the front face of a bar 142 containing a number of sliders 60. As seen, each slider 60 includes MR head 20, which conforms with the head configuration discussed above; however, the detailed features of MR head 20 are not visible in FIG. 5B.

Figure 6A:
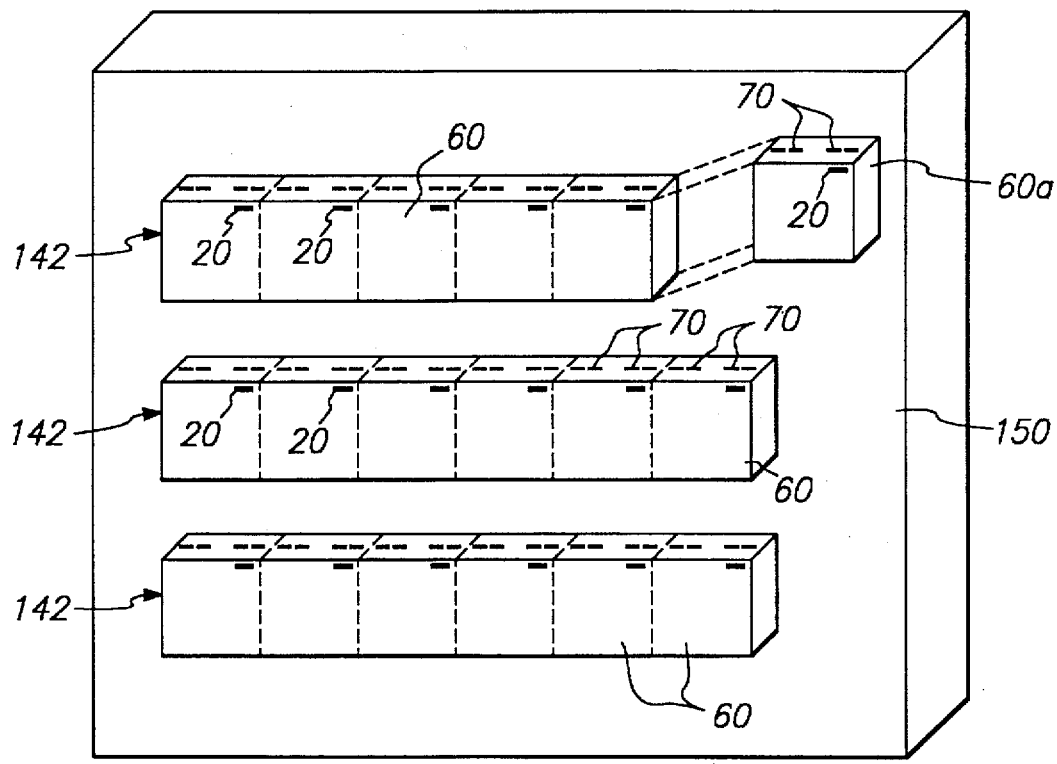
FIGS. 6A and 6B are illustrations of the bars of the wafer shown in FIGS. 5A and 5B, mounted on a processing tool during further processing.

In FIG. 6A, a number of bars 142 of wafer 140 have been transferred to processing tool 150, and, in practical wafer processing operations, each bar 142 is affixed to processing tool 150 by means of an adhesive so that it may be conveniently handled during processing operations. Again, each MR head 20 is separately shown on each slider 60, though not in the detail shown in FIGS. 1 or 2. In the upper right corner of FIG. 6A one of the sliders, 60a has been separated from the other adjoining sliders 60 in the given bar 142, merely for purposes of showing how each slider 60 will eventually be separated from the others at a later stage of wafer processing.

Figure 6B:
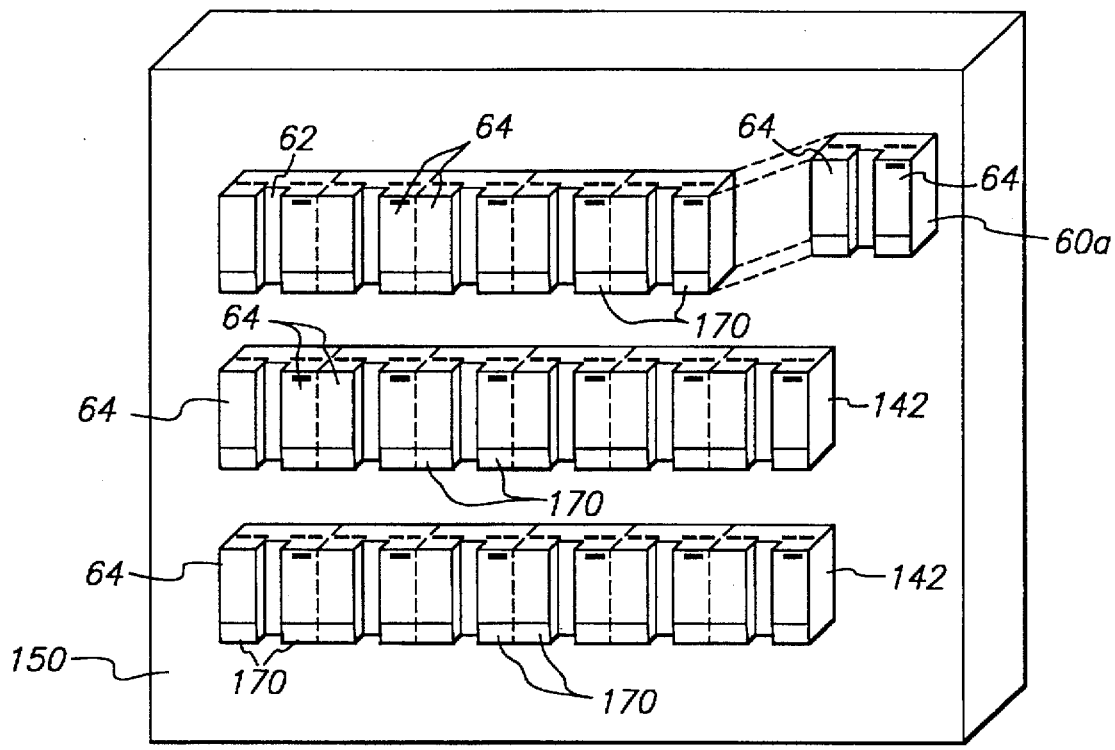

The next stage of the wafer processing is shown on FIG. 6B in which the illustration shows the cutting of channel 62 in each of sliders 60. In the particular embodiment shown, each channel 62 is disposed generally down the center of its respective slider 60, resulting in each slider 60 have two defined ABSs 64 on either side of channel 62. Additionally, each ABS 64 is further processed to create a tapered leading edge 170, which assists considerably in causing the lift which enables MR head 20 to fly over the disk during operation.

After the creation of leading edge 170, slider 60 is processed in a tank containing a solvent, such as acetone or NMP, which will strip and clean any residual photoresist. Next, bars 142 are mounted on a chuck (not shown), and aligned so that bars 142 can be cut into the individual sliders 60. The loose sliders 60 are once again placed in the cleaning solvent, then in a collection tray for rinsing and cleaning, and eventually sliders 60 are sorted and packed for eventual assembly in a disk drive.

Figure 7:
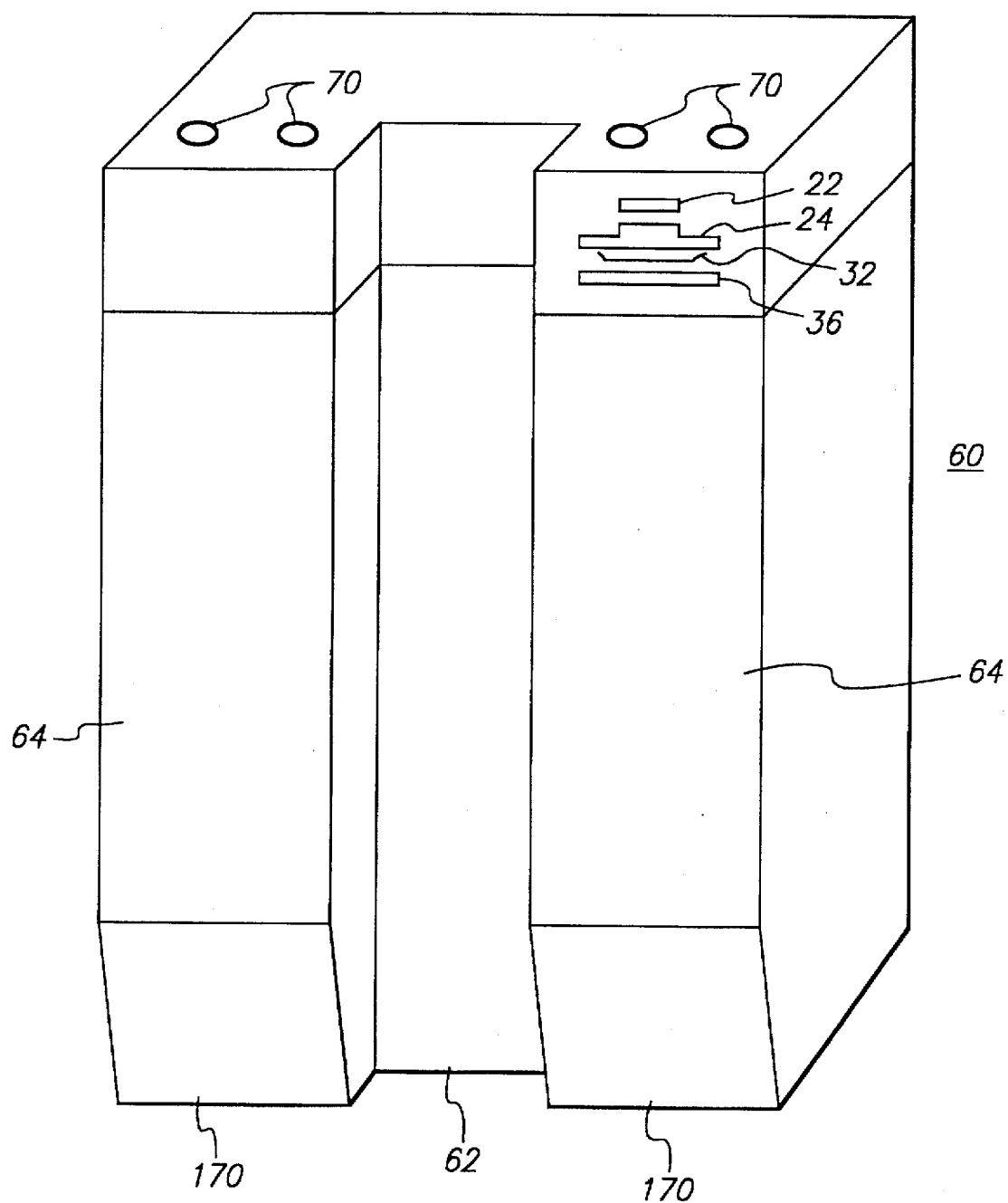
FIG. 7 is an illustration of a single slider with an MR head in accordance with an embodiment of the present invention.

Reference is now made to FIG. 7 for an enlarged view of slider 60 and MR head 20. As seen in FIG. 7, MR head 20 is in the configuration discussed above in connection with FIGS. 1 and 2, namely pole side 30 of pole/shield 24 is approximately the same length as pole 22, and shield side 40 of pole/shield 24 is approximately the same length as shield 36. From FIG. 7 the other features of slider 60 are shown in greater detail than the foregoing illustrations. In particular, channel 62 is disposed down the center of slider 60 with ABSs 64 being on either side. Additionally, each ABS has a tapered leading edge 170. On the top of slider 60, as shown in FIG. 7, are four contacts 70 that are used for the external electrical connections of the slider 60. For example, contacts 70 may be used for the purpose of connecting electrical wiring with the coils 66 and the MR leads 50, shown in FIG. 2.

Up to this point, the embodiment of the process for making MR head 20 and slider 60 that has been discussed is one in which MR head 20 is made as an integral part of the wafer 140 fabrication process. Consequently, all of the sliders 60 produced from wafer 140 will necessarily have an MR head, such as that shown in FIGS. 1 and 2, and all of those MR heads will necessarily be of the same configuration.

In an alternate embodiment of the present invention, a slider 60 with a generic head may be created on the wafer level, and that generic MR head may be subsequently customized to meet the requirements of particular applications. Unlike wafer 140 shown and discussed in connection with FIGS. 5A–6B, which is generally completed after the processing steps discussed above, the wafer 140 of the alternate embodiment is subjected to additional process steps on the bar level in order to create a MR head, which conforms with the head configuration shown on FIGS. 1 and 2.

Figure 8A:
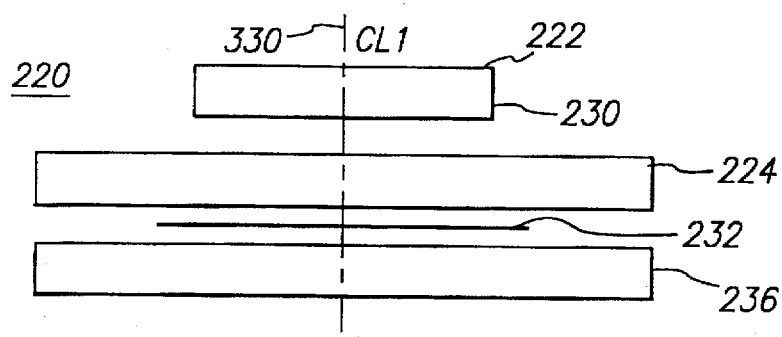
FIGS. 8A–8E are block style illustrations of the post wafer fabrication processing of a generic MR head, in order to manufacture an MR head in accordance with an embodiment of the present invention.

Referring now to FIG. 8A, an MR head 220 is shown to include pole 222, pole/shield 224, MR element 232, and shield 236. For purposes of this detailed discussion it will be assumed that MR head 220 is the head of the sliders 60 shown in FIGS. 5A–6B. In other words, for purposes of this discussion it will be assumed that wafer 140, shown in FIGS. 5A–6B, has been fabricated using the same general fabrication techniques discussed above, excepting only that the technique is altered so that it produces MR head 220 that has the configuration shown in FIG. 8A. Notably in FIG. 8A, the pole side 230 of pole/shield 224 is approximately the same length as shield 236.

Referring momentarily back to FIG. 6B, it will be assumed that the wafer 140 shown in FIG. 6B has been processed so that it includes channel 62, ABSs 64, leading edge 170, and MR head 220 in the configuration shown in FIG. 8A. In order to create the desired MR head configuration, namely the MR head configuration shown in FIGS. 1 and 2, bars 142 containing sliders 60 are further processed while they are still attached to processing tool 150.

Figure 8B:
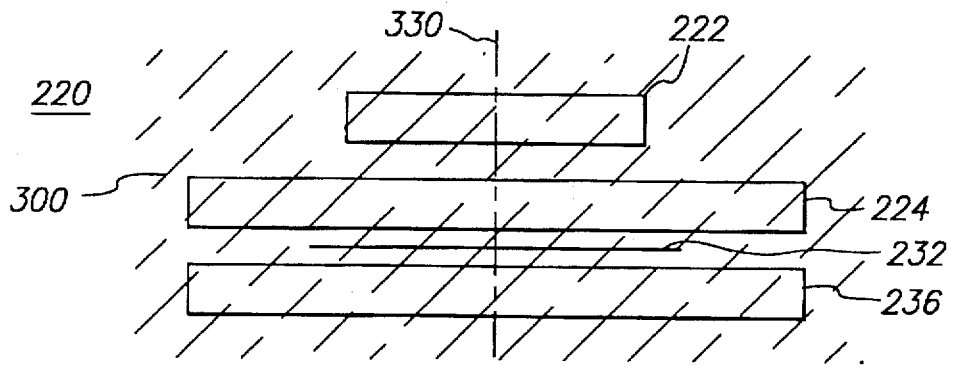

In particular, after creating leading edge 170, but before slicing each bar into the individual sliders 60, a photoresist coating is applied over the entire surface of sliders 60 mounted on processing tool 150. Referring to FIG. 8B an illustration similar to that shown in FIG. 8A is provided; however, in FIG. 8B MR head 220 is shown to be coated with photoresist 300.

It should be noted at this point that although FIGS. 8A–8E all show only a single MR head 220, thereby suggesting that bar 142 processing can be applied to only one MR head 220 at a time, in fact the processing is applied to all of MR heads 20 of sliders 60 mounted on processing tool 150. On the other hand, this discussion focuses upon the single MR head 20 shown in FIGS. 8A–8E because the enlarged view provides greater visual detail.

After the photoresist is applied over all of the bars 142, as shown with respect to one MR head 220 in FIG. 8B, the photoresist is baked onto sliders 60. Then, MR head 220 is generally covered with a mask, which will not permit the transmission of UV light. On the other hand, the mask includes two windows 302 through which UV light can pass. It should be noted that in FIG. 8C, the mask itself is not visible; however, windows 302 are visible and the presence of the mask is indicated by showing the elements of the MR head 220 covered by the mask in dashed lines.

Figure 8C:
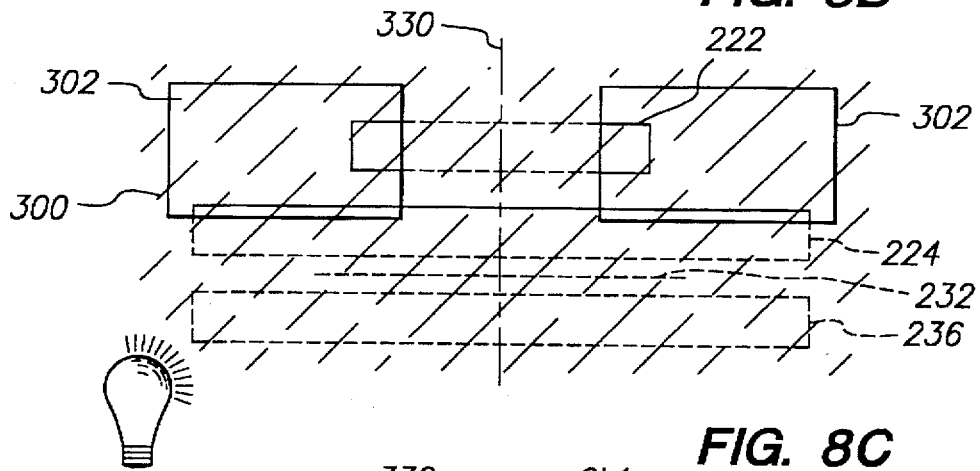
Figure 8D:
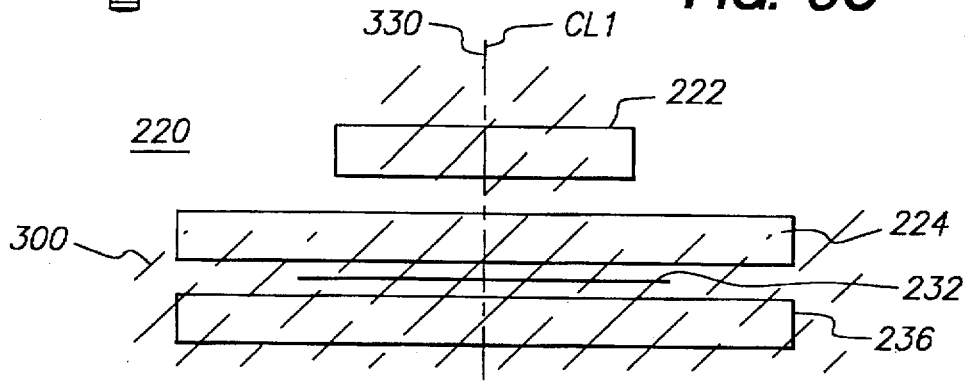

After MR head 220 is covered with the mask, MR head 220 is exposed to UV light, also shown in FIG. 8C. As UV light passes through windows 302 it will interact with the photoresist such that the photoresist struck by the UV light can be developed out in a development tank. Thus, after exposure to UV light, the processing tool 150 and bars 142 of sliders 60 are immersed in a development tank to remove the photoresist exposed to UV light. The photoresist remaining after immersion in the development tank would be in the pattern shown on FIG. 8D.

The sliders 60 on processing tool 150 are then mounted in a vacuum system in which energetic plasma ions are caused to strike the side of each MR head 220 that is coated with photoresist. As a result of this process, not only is the photoresist etched away, but also the unprotected regions of each slider 60 are etched away. More particularly, the portion of MR head 220 that had no photoresist coating it at the commencement of the plasma ion bombardment will be eroded. As seen by referring to FIG. 8D, that uncoated portion that erodes away is a small portion of pole 222, and a larger portion of pole side 230 of pole/shield 224.

Figure 8E:
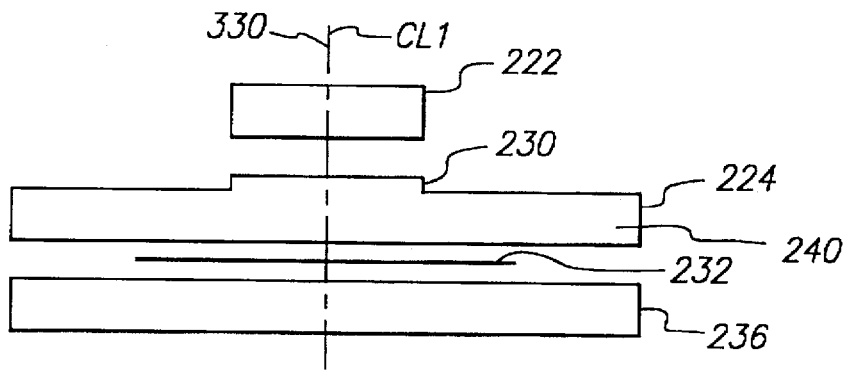

The end result of the plasma ion bombardment stage is the MR head 20 configuration shown in FIG. 8E. As seen, in FIG. 8E, pole side 230 of pole/shield 224 is approximately the same dimension as pole 222, and shield side 240 of pole/shield 24 is approximately the same dimension of shield 236. This, of course, is the same general MR head configuration shown in connection with FIGS. 1 and 2, which, as explained in connection with FIGS. 5A–6B, could be integrally designed into wafer 140.

On the other hand, the advantage of this alternate approach, discussed in connection with FIGS. 8A–8E, is that the specific MR head configuration may be customized to suit any number of specific applications. Additionally, it is not necessary for all of the MR heads produced from a given wafer to be processed in this same manner, as some of the MR heads may be processed using different techniques such as those shown and discussed in connection with FIG. 9A and 9B.

After the completion of these steps, the customization of MR head 220 is complete, and bars 142 may be processed in the same manner discussed above. Namely, they would be placed in a solvent to strip residual photoresist, cut into individual sliders 60, and cleaned and rinsed in anticipation of subsequent integration into a disk drive.

Referring momentarily back to FIGS. 8A–8E, it will be noted that each illustration includes a centerline (CL1) 330 which bisects MR head 220. By referring to CL1 330, it can be seen that pole 222 and pole side 230 of pole/shield 224 share the same center line as MR element 232. In any given application, it may be desirable to alter the center line of pole 222 and pole side 230 of pole/shield 224 relative to MR element 232. This may be done for the purpose of skewing the relative positions of the write element relative to the read element of MR head 220. Advantageously, the process of constructing MR head 220, discussed in connection with FIGS. 8A–8E, is readily adapted for any such adjustment.

Figure 9A:
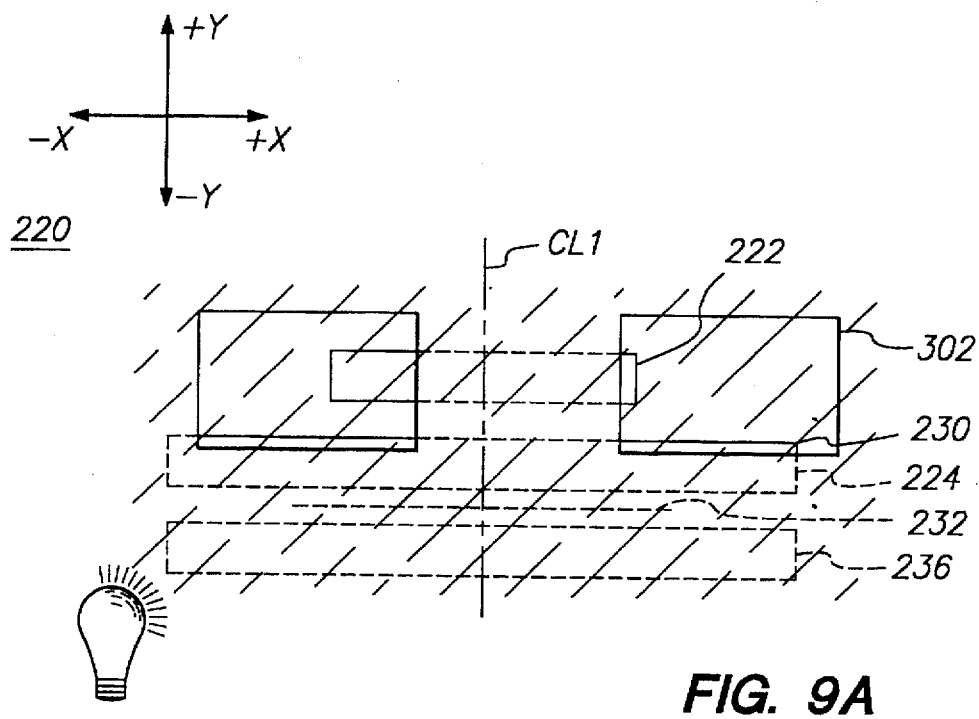
FIGS. 9A–9B are block style illustrations of a variation of the processing technique shown in FIGS. 8A–8E, in order to manufacture an MR head in accordance with an alternate embodiment of the present invention.

Referring now to FIG. 9A, an illustration of the MR head 220 construction process, similar to that shown in FIG. 8C, is provided. For purposes of this detailed discussion, it will be assumed that MR head 220 illustrated in FIG. 9A has been processed in the same manner as MR head 220 was processed in connection with the discussion of FIGS. 8A–8B. Accordingly, at the point of the process shown in FIG. 9A, MR head 220 has already been covered with photoresist.

FIG. 9A further includes an orientation key, in the form of a typical X-Y axis, which can describe the adjustment of mask and windows 302 relative to MR head 220. In the particular embodiment illustrated in FIG. 9A, mask has been adjusted in +X direction accounting for more of the left side of pole 222 being exposed and less of the right side of pole 222 being exposed through windows 302. Therefore, when MR head 220 is next exposed to ultraviolet light passing through windows 302, then immersed in a development tank, and finally bombarded with energetic plasma ions, as detailed above in connection with the discussion of FIGS. 8A–8E, a different portion of pole 222 and pole side 230 of pole/shield 224 will be eroded away than the portion eroded away as a result of the mask 302 positioning shown in FIG. 8C.

Figure 9B:
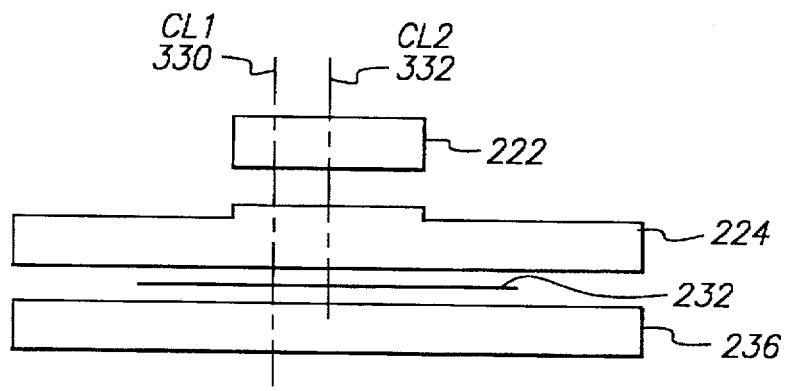

Referring now to FIG. 9B, an illustration is provided of the end result of the mask and window 302 adjustment shown in FIG. 9A, after MR head 220 has been fully processed as discussed above. In particular, FIG. 9B illustrates an MR head 220 in which the centerline (CL2) 332 of pole 222 is different than the centerline (CL1) 330 of MR element 232. It should also be noted that in other implementations of the invention, mask could be adjusted in the −X direction, resulting in CL2 332 being adjusted to the left side of CL1 330 in FIG. 9B. Additionally, in other embodiments mask could be adjusted in the +Y or −Y direction to create a pole side 230 of pole/shield 224 which is more or less pronounced relative to shield side 240 of pole/shield 224.

As indicated above, one of the significant advantages to this approach is that a wafer, such as wafer 140 shown in FIGS. 5A and 5B can be constructed with a generic MR head 220, such as that shown in FIG. 8A, for each of the sliders 60 that will be processed from wafer 140. Using the post wafer 140 fabrication techniques discussed above, in connection with FIGS. 8A–9B, the particular MR head 220 desired to fit a given application can then be custom made. Depending on the number of MR heads which are to be made in an actual production environment, this customization approach can be less expensive than constructing the particular MR head on the wafer level.

Referring back to Step 114 of FIG. 3, relating to the creation of the pole/shield 24 by the photoresist/etch process, an alternative plate framing process for creating a pole side 30 and a shield side 40 having differing lengths as desired is described below. To allow for tighter tolerances in the length dimension of the pole side 30, and in particular where the pole side 30 of the pole/shield 24 is to be up to 25% longer than the length of the pole 22, this alternative method for creating the pole side of the pole shield can be utilized. This alternative embodiment includes the use of a two-step plate framing process to replace the single step plate framing process discussed above with respect to Step 114 of FIG. 3.

First, the previously described plate framing process is used to produce the shield side 40 of the pole/shield 24 of a desired length, such as the length of the shield 36, and is analogous to the process used to add the pole/shield 24 in the previous embodiment. Second, the pole side 30 of the pole/shield 24 is produced, using the plate framing process, immediately subsequent to producing the shield side 40. The mask used to expose the pole side 30 is designed to result in the deposition of the pole side 30, having the end result dimensions desired, during the electroplating process. The alternative process is designed to insure the necessary electrical connection between the pole side 30 and the shield side 40.

Use of this alternative process eliminates the need for the subsequent etch step in the original process which made the pole side 30 have the same or similar dimensions as the pole 22, the relative size limits of which have been previously provided.

Accordingly, the invention in its broader aspects is not limited to the specific details, representative apparatus, and illustrative examples shown and described herein. Thus, departures may be made from such details without departing from the spirit or scope of the invention.

The invention claimed is:

1. A head on a slider for reading and writing data on a disk comprising:

a pole/shield having a pole side, which is used for writing when the head engages in a write operation, and having a shield side, which is used for shielding when the head engages in a read operation, said pole side and said shield side being at least partially coextensive with each other, said pole side defining a length extending substantially transverse to the longitudinal dimension of the slider and said shield side defining a length extending substantially transverse to the longitudinal dimension of the slider, said pole side length being different than said shield side length.

2. The head as in claim 1, further comprising a pole having a length extending substantially transverse to the longitudinal dimension of the slider, which is used when the head engages in a write operation, and said pole side length is the same as said length of said pole.

3. The head as in claim 1, further comprising a pole having a length extending substantially transverse to the longitudinal dimension of the slider, which is used when the head engages in a write operation, and said pole side length is no more than 20% shorter than said length of said pole.

4. The head as in claim 1, further comprising a pole having a length extending substantially transverse to the longitudinal dimension of the slider, which is used when the head engages in a write operation, and said pole side length is no more than 25% longer than said length of said pole.

5. The head as in claim 1, further comprising a pole having a length, which is used when the head engages in a write operation, and said pole side length is no more than 25% longer than said length of said pole.

6. A slider for reading and writing data on a disk comprising:

an MR head having a pole/shield, said pole/shield having a pole side used when said MR head engages in a write operation, and having a shield side which is used for shielding when said MR head engages in a read operation, said pole side and said shield side being at least partially coextensive with each other, said pole side defining a length extending substantially transverse to the longitudinal dimension of said slider, and said shield side defining a length extending substantially transverse to the longitudinal dimension of said slider, said pole side length being different than said shield side length.

7. The slider as in claim 6, wherein said pole side length is shorter than said shield side length.

8. The slider as in claim 6, wherein said MR head further includes a pole having a length extending substantially transverse to the longitudinal dimension of said slider, which is used when said MR head engages in a write operation, and said pole side length is the same as said length of said pole.

9. The slider as in claim 6, wherein said MR head further includes a pole having a length extending substantially transverse to the longitudinal dimension of said slider, which is used when said MR head engages in a write operation, and said pole side length is no more than 20% shorter than said length of said pole.

10. The slider as in claim 6, wherein said MR head further includes a pole having a length extending substantially transverse to the longitudinal dimension of said slider, which is used when said MR head engages in a write operation, and said pole side length is no more than 25% longer than said length of said pole.

11. A disk drive comprising:

magnetic storage means; and a slider for reading and writing data on said storage means, said slider having an MR head which includes a pole/shield, said pole/shield having a pole side, which is used when said MR head engages in a write operation, and which includes a shield side, which is used for shielding when said MR head engages in a read operation, said pole side and said shield side being at least partially coextensive with each other, said pole side defining a length extending substantially transverse to the longitudinal dimension of said slider, and said shield side defining a length extending substantially transverse to the longitudinal dimension of said slider, said pole side length being different than said shield side length.

12. The disk drive as in claim 11, wherein said pole side length is shorter than said shield side length.

13. The disk drive as in claim 11, wherein said MR head further includes a pole having a length extending substantially transverse to the longitudinal dimension of said slider, which is used when said MR head engages in a write operation, and said pole side length is the same as said length of said pole.

14. The disk drive as in claim 11, wherein said MR head further includes a pole having a length extending substantially transverse to the longitudinal dimension of said slider, which is used when said MR head engages in a write operation, and said pole side length is no more than 20% shorter than said length of said pole.

15. The disk drive as in claim 11, wherein said MR head further includes a pole having a length extending substantially transverse to the longitudinal dimension of said slider, which is used when said MR head engages in a write operation, and said pole side length is no more than 25% longer than said length of said pole.

16. A method for making a MR head on a slider, comprising the step of:

fabricating the MR head which has a pole/shield, said pole/shield having a pole side, which is used when the MR head engages in a write operation, and having a shield side, which is used for shielding when the MR head engages in a read operation, said pole side and said shield side being at least partially coextensive with each other, said pole side defining a length extending substantially transverse to the longitudinal dimension of the slider and said shield side defining a length extending substantially transverse to the longitudinal dimension of the slider, said pole side length being different than said shield side length.

17. The method as in claim 16, wherein during said fabricating step the pole side length is made to be shorter than the shield side length.

18. The method as in claim 16, further comprising the step of:

fabricating the MR head to include a pole having a length extending substantially transverse to the longitudinal dimension of said slider, and said length of said pole and the pole side length are made to be substantially equal.

19. The method as in claim 16, further comprising the step of:

fabricating the MR head to include a pole having a length extending substantially transverse to the longitudinal dimension of said slider, and said pole side length is made to be no more than 20% shorter than said length of said pole.

20. The method as in claim 16, further comprising the step of:

fabricating the MR head to include a pole having a length extending substantially transverse to the longitudinal dimension of said slider, and the pole side length is made to be no more than 25% longer than said length of said pole.

21. The method as in claim 16, wherein said fabricating step occurs during wafer level fabrication.

22. The method as in claim 16, wherein said fabricating step occurs during bar level fabrication.

* * * * *